United States Patent [19]
Babb et al.

[11] Patent Number: 6,144,899
[45] Date of Patent: Nov. 7, 2000

[54] RECOVERABLE AIRBORNE INSTRUMENT PLATFORM

[75] Inventors: Michael L. Babb; Michael William Douglas; Davis M. Egle; Kenneth Wayne Howard, all of Norman, Okla.

[73] Assignee: University Corporation for Atmospheric Research, Boulder, Colo.

[21] Appl. No.: 09/410,883

[22] Filed: Oct. 4, 1999

[51] Int. Cl.⁷ ........................................................ B64D 1/00
[52] U.S. Cl. ................................ 701/3; 701/16; 701/200; 701/213; 244/3.1; 244/32; 102/384; 102/387; 342/62
[58] Field of Search ..................................... 701/3, 10, 16, 701/200, 213, 214, 300; 244/32, 138 R, 142, 151 B, 163, 3.1; 367/4; 342/62; 102/384, 387

[56] References Cited

U.S. PATENT DOCUMENTS 5,186,418   2/1993   Lauritsen .

OTHER PUBLICATIONS

Ma Shuqin, Wang Gai, and Pan Yi, "Returnable GPS Sonde," American Meterological Society, p. 599–603, (1998), Apr.

*Primary Examiner*—William A. Cuchlinski, Jr.
*Assistant Examiner*—Yonel Beaulieu
*Attorney, Agent, or Firm*—Duft, Graziano & Forest, P.C.

[57] ABSTRACT

The recoverable airborne instrument platform accurately determines its present position and uses this data to execute a predetermined flight plan and ultimately guide its descent to a predetermined landing site. This is accomplished by installing the instrument package payload in the aerodynamic exterior housing of the recoverable airborne instrument platform, which has a plurality of moveable control surfaces thereon to autonomously control the altitude, attitude and flight path of the recoverable airborne instrument platform. A navigation circuit contained within the aerodynamic housing determines the geographic location of the recoverable airborne instrument platform as well as the location of at least one predetermined recovery site. The determined position data is used to dynamically calculate a flight path which allows the guidance control circuit to both execute a predetermined flight plan and controllably descend the recoverable instrument platform to a selected predetermined recovery site. Upon arrival at the selected predetermined recovery site, the recoverable airborne instrument platform descends to a predetermined height over the selected predetermined recovery site and activates a parachute release mechanism to controllably descend to the selected predetermined recovery site.

22 Claims, 8 Drawing Sheets

RECOVERABLE AIRBORNE INSTRUMENT PLATFORM

FIELD OF THE INVENTION

This invention relates to instrument packages that are used to make measurements of atmospheric conditions and, in. particular, to a highly stable recoverable airborne instrument platform that both contains the instrument package and pilots itself through a predetermined flight plan in an autonomous manner to a predetermined landing site.

PROBLEM

It is a problem in the field of instrumentation to accurately make measurements of certain designated parameters in a cost effective manner. For example, there are numerous measurements of local atmospheric conditions that are taken on a regular basis by instruments termed "sondes," and these measurements include: air temperature, humidity, air pressure and wind velocity. The need for the sondes that perform these daily synoptic observations is as great today as it has ever been. However, high sonde costs threaten to reduce or eliminate the daily soundings taken at some sites in the worldwide sounding network. The high cost per sounding is due to the fact that the sondes that are launched into the atmosphere descend in an uncontrolled manner by parachute and are recovered in relatively few instances. Therefore, these instrument packages must be built to be disposable, which limits the cost of equipment that can be installed therein. It is evident that the present methodology of obtaining data on atmospheric conditions is of unsatisfactory accuracy and cost. There is therefore a critical need for a sonde that delivers a higher level of performance than the sonde of today but at a lower cost per sounding.

The sonde launching operations used to take these measurements can be divided into two general classifications: fixed base operations, and airborne operations. In the airborne operations, an airplane passes over the site at which the measurements are to be taken and releases the sonde instrument package, which is carried by parachute in a controlled descent to the ground. This aircraft released instrument package is called a dropsonde and the deployment of this instrument package is expensive since it requires the use of a aircraft. In the fixed base operations, the sonde instrument package is carried aloft by a balloon from a fixed launch site, such as an airport. The balloon expands as the altitude increases and eventually bursts. Once the balloon bursts, the sonde instrument package is released and a parachute is deployed to provide a controlled descent of the sonde back to the ground. In addition, the exact position of the balloon and its sonde is determined solely by the ambient wind conditions during the course of its flight. The balloon and its instrument package are frequently propelled by the wind over the horizon or into areas which make recovery of the instrument package difficult. Also, the parachute can not control the position of the sonde during the descent phase of the flight and the ambient winds further transport the sonde in a manner that is beyond the control of the fixed site operators. Recovery of the sonde once it reaches the earth is a function of the ability of the package to be spotted during its descent phase or to be located while on the ground.

The Self Guided Recoverable Airborne Instrument Module described in U.S. Pat. No 5,186,418 comprises a delta wing airframe with a controllable rudder that enables the enclosed instrument package payload to be recovered with a high degree of certainty. A navigation circuit contained within the housing references the radio frequency transmissions of a number of beacons to determine the altitude and geographic position of the instrument package. This location information is compared with stored data that identifies a plurality of landing sites and is used to guide the recoverable airborne instrument module to a selected one of the identified landing sites. However, the delta wing design of this airframe has a lift to drag ratio of approximately 2.4 and requires sophisticated controls to maintain stability of flight. This airframe design cannot take wind conditions and provides only limited flight path and flight attitude control. Furthermore, the basic airframe design is not adaptable for differing ambient wind conditions and payloads.

Therefore, there is presently no instrument package, used to make measurements of atmospheric conditions, that can pilot itself through a predetermined flight plan in an autonomous manner to a predetermined landing site while providing an inherently stable flight platform that is adaptable to varying ambient wind conditions and payloads.

SOLUTION

The above described problems are solved and a technical advance achieved in the field by the recoverable airborne instrument platform which accurately determines its present position and uses this data to execute a predetermined flight plan and ultimately guide its descent to a predetermined landing site. This is accomplished by installing the instrument package payload in the aerodynamic exterior housing of the recoverable airborne instrument platform, which has a plurality of moveable control surfaces thereon to autonomously control the altitude, attitude and flight path of the recoverable airborne instrument platform. A navigation circuit contained within the aerodynamic housing determines the geographic location of the recoverable airborne instrument platform as well as the location of at least one predetermined recovery site. The determined position data is used to dynamically calculate a flight path which allows the guidance control circuit to both execute a predetermined flight plan and controllably descend the recoverable instrument platform to a selected predetermined recovery site. Upon arrival at the selected predetermined recovery site, the recoverable airborne instrument platform descends to a predetermined height over the selected predetermined recovery site and activates a parachute release mechanism to controllably descend to the selected predetermined recovery site.

In operation, the recoverable airborne instrument platform is carried aloft by balloon in the traditional manner, enabling the instrument package contained therein to perform its series of measurements of atmospheric conditions. The recoverable airborne instrument platform includes a heading sensor that serves to stabilize and direct the recoverable airborne instrument platform, a guidance control circuit that directs the return of the recoverable airborne instrument platform to a recovery site, an aerodynamic airframe that has an acceptable glide ratio and is rugged enough to protect the instrument payload and still be reusable, and a parachute to return the recoverable airborne instrument platform to ground in a safe manner. Upon release from the balloon via a cut down device, the guidance control circuit is activated to determine the present location of the recoverable airborne instrument platform from the Global Positioning System (GPS) signals that are available worldwide. The guidance control circuit then computes a flight plan to cover a predetermined flight path as well as self-guide the recoverable airborne instrument platform to a landing at a selected recovery site. The guidance control circuit uses the airframe rudder and elevators to steer the recoverable airborne instrument platform, as well as control its altitude and attitude, to glide in a controlled descent, through the predetermined flight plan toward the selected predetermined recovery site. A heading sensor is included in the recoverable airborne instrument platform, operable independent of the guidance control circuit, to maintain the course of the recoverable airborne instrument platform, and is needed when the ambient wind encountered in the flight path is greater than glide speed, which conditions can cause erroneous readings by the guidance control circuit. The exterior housing of the recoverable airborne instrument platform has an aerodynamic shape with a controllable rudder, elevators, and optional speed brake, to enable the recoverable airborne instrument platform to follow a predetermined flight path. The recoverable airborne instrument platform is landed at the recovery site in a traditional glider mode, or a supplementary parachute can be deployed a short distance above the recovery site in order to land the recoverable airborne instrument platform in a more vertical trajectory without damaging the airframe or the payload contained therein.

One advantage of the present recoverable airborne instrument platform over the various systems presently in use, is that the recoverable airborne instrument platform is autonomous of ground control and can be programmed to fly any desired glide flight path. The recoverable airborne instrument platform uses air speed data and a heading system to determine the orientation of the recoverable airborne instrument platform and can operate its elevators for trim and speed control as well as flight path controls (spoilers, drag brakes, etc) to eliminate overflights and a rudder for heading control. The wings of the recoverable airborne instrument platform are removable and any of a number of wings can be installed to control the lift to drag ratio, to accommodate present wind conditions, range of operations and instrument payloads. The airframe is a wing/body vehicle, not just an aerodynamically shaped wing or delta wing, which provides a significant improvement in range and flight control. The recoverable airborne instrument platform also uses a unique parachute reefing mechanism to minimize ground drag damage after initial ground contact. The processor contained in the recoverable airborne instrument platform not only functions to operate the flight control mechanism, but also is part of an integrated system of onboard data storage and processing of the data that is collected by the various sensors that comprise the instrument package payload.

BRIEF DESCRIPTION OF THE DRAWING

FIGS. 9A and 9B illustrate perspective views of the tail cone of the recoverable airborne instrument platform in its pre-deployed and deployed attitudes, respectively, while

DETAILED DESCRIPTION

In a typical fixed site operation, such as a National Weather Services observation site, the weather observers periodically release one or more balloons with an attached instrument package (commonly referred to as a rawinsonde), in order to measure temperature, humidity, air pressure and wind conditions at various altitudes around the fixed site. The measurements taken by the rawinsonde are transmitted by radio frequency to a receiver located at the fixed site. The exact position of the balloon and its instrument package is determined solely by the ambient wind conditions during the course of its flight. The balloon and its instrument package are typically propelled by the wind over the horizon or into areas which make recovery of the instrument package difficult. In the traditional rawinsonde application, once the balloon reaches a predetermined altitude and bursts, the rawinsonde is released from the balloon and a parachute is deployed in order to controllably return the rawinsonde to the ground. Again, the parachute can not control the position of the rawinsonde during the descent phase of the flight and the ambient winds further transport the rawinsonde in a manner that is beyond the control of the fixed site operators. Recovery of the rawinsonde once it reaches the earth is a function of the ability of the package to be spotted during its descent phase or to be located while on the ground.

Recoverable Airborne Instrument Module Architecture

Figure 1:
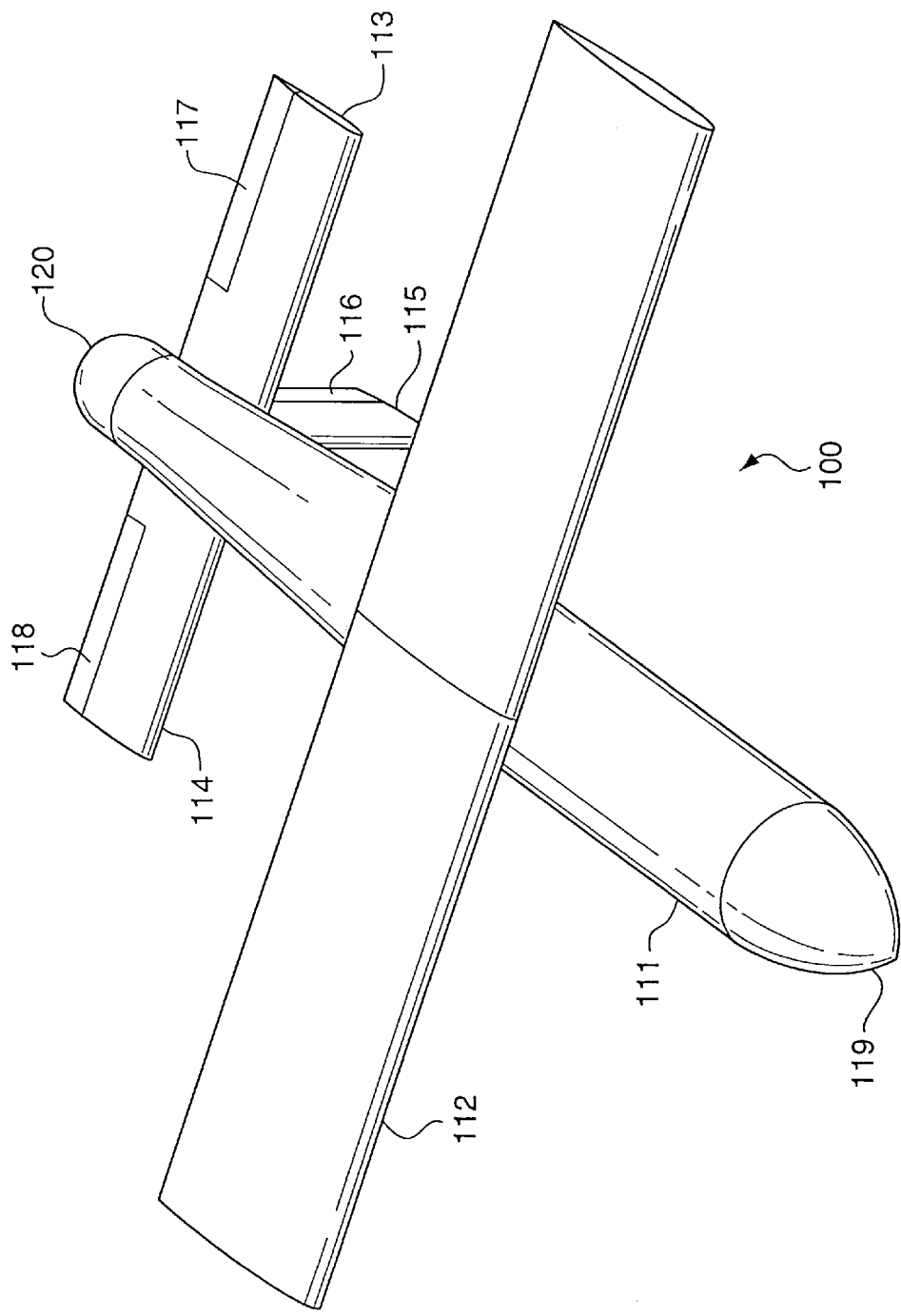
FIG. 1 illustrates in top perspective view the architecture of the recoverable airborne instrument platform.
Figure 2:
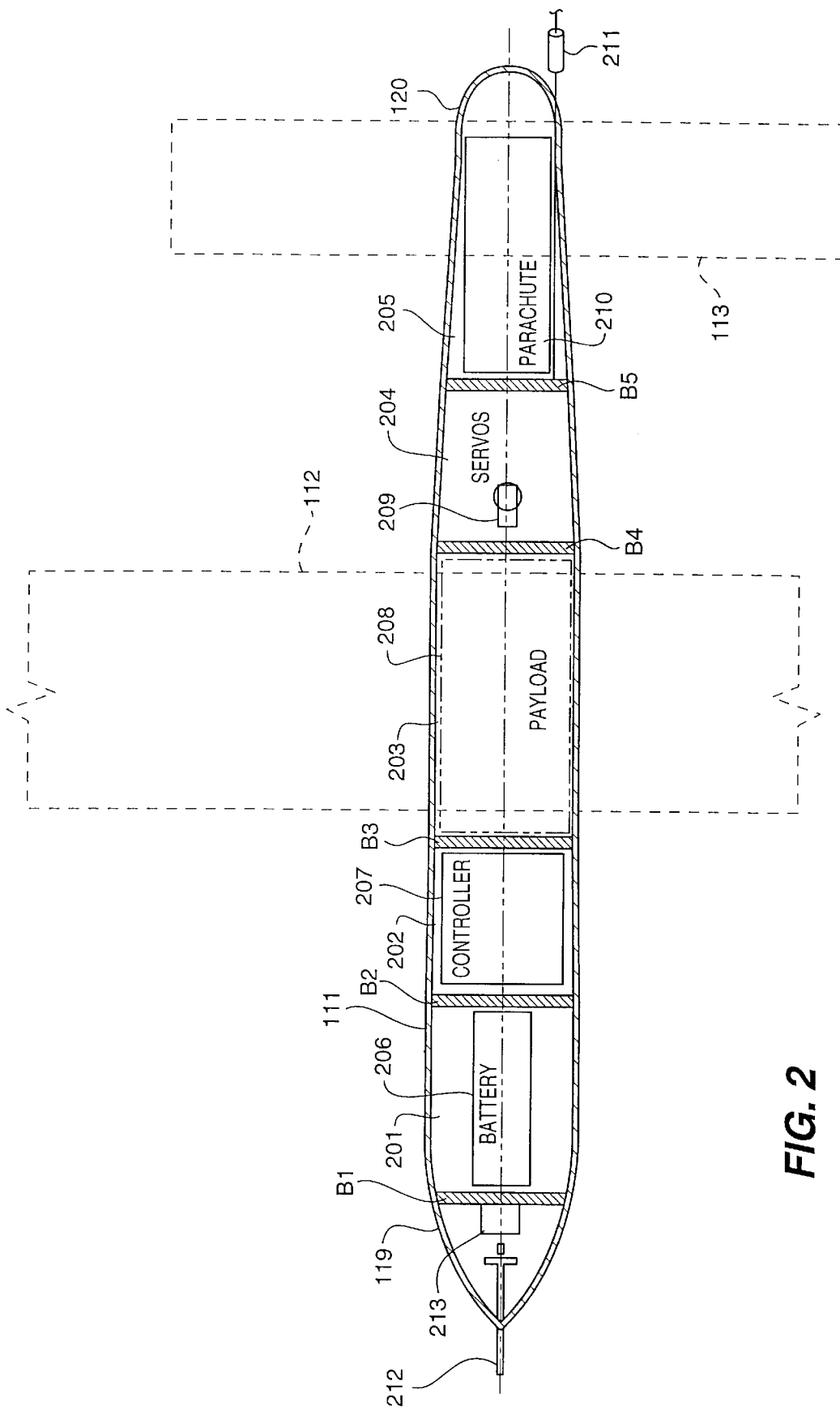
FIG. 2 illustrates a plan cross-section view of the recoverable airborne instrument platform airframe and its contents.

The design criteria for the recoverable airborne instrument platform 100 shown in perspective view in FIG. 1 include: (1) great inherent aerodynamic stability, (2) simplicity of control, (3) low mass and high frangibility (for safety reasons), and (4) modest cost. Typical design parameters for the recoverable airborne instrument platform 100 are that this apparatus has a lift to drag ratio of at least three to one, which allows the recoverable airborne instrument platform 100 to glide at least three kilometers for every kilometer descent in altitude in still air. A forward velocity of at least twenty meters per second gives the recoverable airborne instrument platform good penetration characteristics and minimizes the destabilizing effects of turbulent air. There are a number of possible designs of the exterior housing of the recoverable airborne instrument platform 100 and FIG. 1 illustrates a simple air frame which is selected because of its inherent stability, simplicity of construction, and the ability to exchange wings to account for changes in ambient wind speed, mission characteristics and payload.

The recoverable airborne instrument platform 100 is implemented using an aerodynamic housing 111 which has a plurality of moveable control surfaces 116–118 thereon. A Global Positioning System contained within the housing 111 provides data indicative of the present altitude and geographic location of the recoverable airborne instrument platform 100. A memory in the flight control circuit of the recoverable airborne instrument platform 100 stores data noting the location of at least one predetermined recovery site in the vicinity of the launch site. The flight control circuits contained in the recoverable airborne instrument platform 100 use the calculated position data and ambient wind condition data to dynamically calculate a flight path to controllably descend the recoverable airborne instrument platform 100 to a selected one of the predetermined recovery sites.

Recoverable Airborne Instrument Platform Airframe

FIG. 1 illustrates in perspective view the architecture of the recoverable airborne instrument platform 100 and FIG.

2 illustrates a plan cross-section view of the recoverable airborne instrument platform airframe and its contents. The exterior housing 111 of the recoverable airborne instrument platform 100 consists of a lightweight material which is configured in an aerodynamic shape which includes a removable wing 112 to provide lift and a plurality of moveable control surfaces (a rudder 116 and elevators 117,118) on the tail 113 to provide steering and flight control capability for the recoverable airborne instrument platform 100. The placement and respective weight of the flight control components 206–207, 209–210, 213 and the instrument package payload 208 within the exterior housing 111 determines the pitch necessary for a stable glide. The basic airframe construction is typically fabricated from a 3" ID cardboard tube, and equipped with a cardboard nosecone 119. The exterior housing 111 is wrapped with fiberglass to provide a weather resistant coating. The recoverable airborne instrument platform 100 is typically divided into a number of compartments 201–205 by means of bulkheads B1–B5 to house the various components that comprise the flight control elements 206–207, 209–210, 213 as well as payload 208. The flight control elements include a circuit board 207 that contains the flight control circuits, as described below. A battery 206 provides the power to operate both the circuitry mounted on the circuit board 207 as well as the servo systems 209 controlled by the circuitry mounted on the circuit board 207.

Tail Cone and Cut Down Device

Figure 9A:
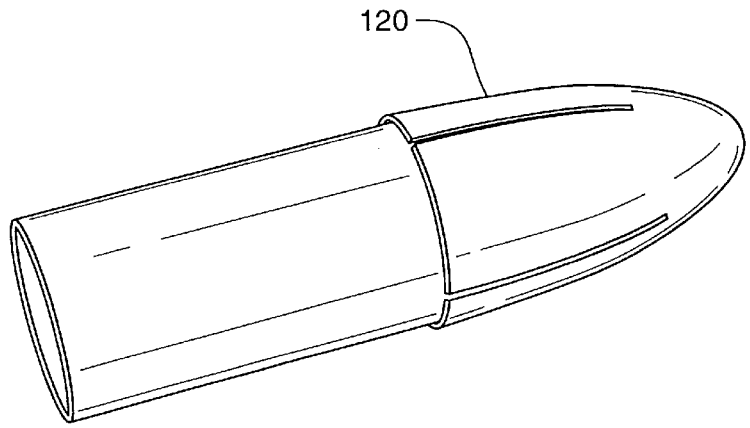
Figure 9B:
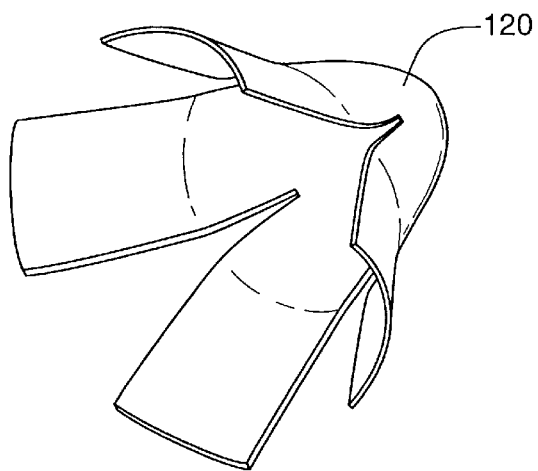
Figure 9C:
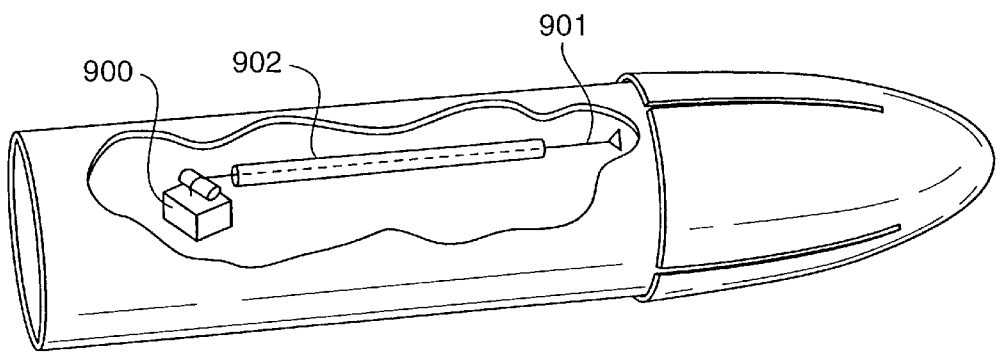
FIG. 9C illustrates the mechanism used to expel the tail cone of the recoverable airborne instrument platform.

FIGS. 9A and 9B illustrate perspective views of the tail cone 120 of the recoverable airborne instrument platform 100 in its pre-deployed and deployed attitudes, respectively, while FIG. 9C illustrates the mechanism used to expel the tail cone 120 of the recoverable airborne instrument platform 100. This apparatus typically includes a parachute 210 housed in the compartment 205 that is located at the tail end thereof and maintained in place by tail cone 120, with the parachute 210 being used for the final stage of the descent. The tail cone 120 is attached to the parachute 210 and acts as a parachute drag to facilitate parachute deployment. The tail cone 120 has a clover leaf tabs that snap fit in the opening of the exterior housing 111 and the servo 900 operates a push rod 901 that moves within push rod guide 902 to push the tail cone 120 out, which pulls the parachute 210 along with it.

In operation, the recoverable airborne instrument platform 100 is carried aloft by a balloon in the traditional manner via an attachment point 211 on the tail of the recoverable airborne instrument platform 100, enabling the instrument package 208 contained therein to perform its series of measurements of atmospheric conditions. Upon release from the balloon via servos 209 operating cut-down device 211, the guidance control circuit on the circuit board 207 is activated to determine the present location of the recoverable airborne instrument platform 100 from the Global Positioning Satellite signals that are available worldwide. The guidance control circuit then computes a flight plan to cover a predetermined flight path as well as self-guide the recoverable airborne instrument platform 100 to a landing at a selected recovery site. The guidance control circuit uses the rudder 116 and elevators 117, 118 to steer the recoverable airborne instrument platform 100, as well as control its altitude and attitude, which glides in a controlled descent, through the predetermined flight plan toward the selected predetermined recovery site. The recoverable airborne instrument platform 100 is landed at the recovery site in a traditional glider mode, or a supplementary parachute 210 can be deployed a short distance above the recovery site in order to land the recoverable airborne instrument platform 100 in a more vertical trajectory. When the recoverable airborne instrument platform 100 lands on its nose 109, the rod 212 impacts switch 213 to cause servos 209 to release the parachute 210.

Typical Flight Plan of Recoverable Airborne Instrument Platform

Figure 8:
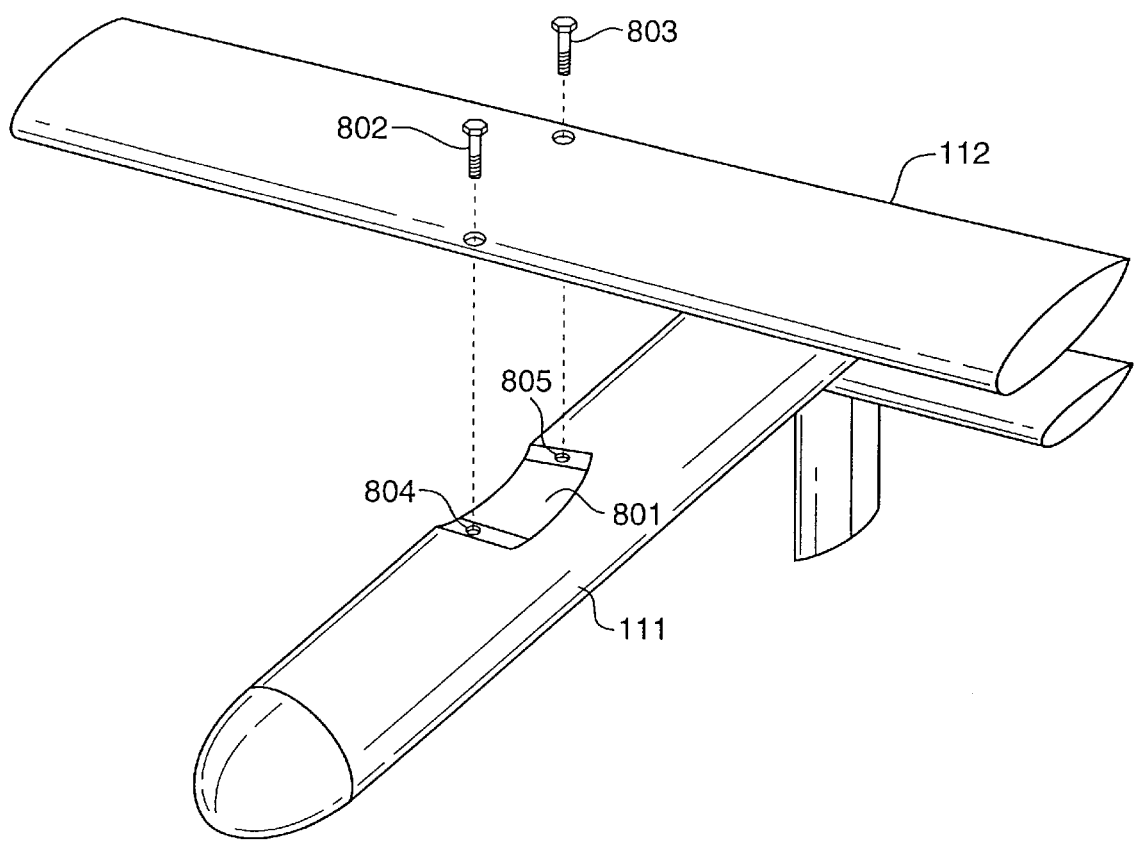
FIG. 8 illustrates in top perspective view the attachment of the removable wing to the body of the recoverable airborne instrument platform.

The flight path of the recoverable airborne instrument platform 100 is controllable in that the elevators 117, 118 control both the airspeed as well as time aloft since elevator trim enables the recoverable airborne instrument platform to fine tune its velocity. In addition, the operator can customize the airframe by a simple wing replacement. The wing 112 is replaceable to account for payload that is carried. FIG. 8 illustrates in top perspective view the attachment of the removable wing 112 to the body 111 of the recoverable airborne instrument platform 100. The operator can therefore select the lift to drag ratio which is proportional to $span^2/area$. The speed of the recoverable airborne instrument platform 100 is a function of the wing loading and a reduction in wing area increases speed. The recoverable airborne instrument platform 100 requires a 10° glide path so the wing 112 is placed above the fuselage 111 which causes the tail surfaces to be in the air flow. The wing 112 fits in wing saddle 801 and bolts 802, 803 fit through wing 112 and fit into corresponding nuts 804, 805 mounted in fuselage 111. The recoverable airborne instrument platform 100 is inherently stable and no autopilot is needed to maintain level flight. Autopilot mechanisms are power intensive and therefore require a larger battery.

Figure 6:
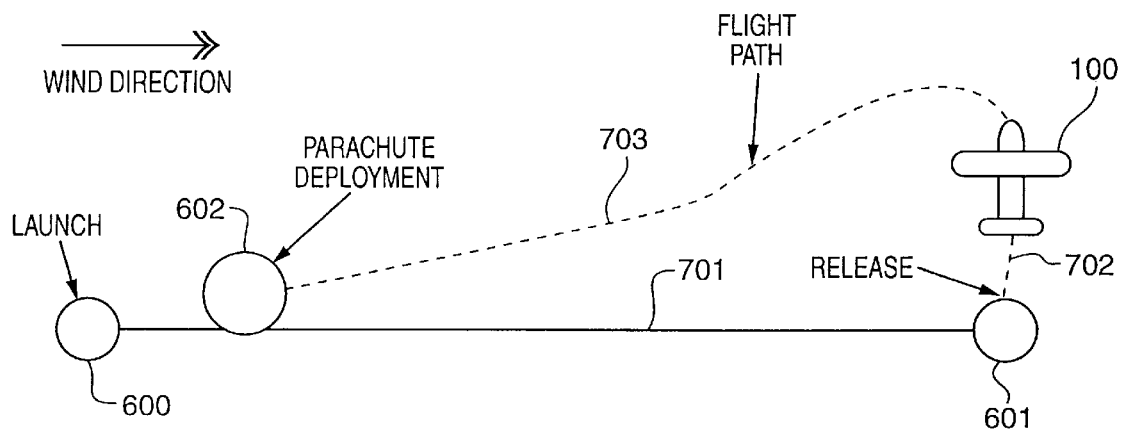
FIGS. 6 and 7 illustrate top plan and side plan views, respectively, of a typical flight plan of the recoverable airborne instrument platform.
Figure 7:
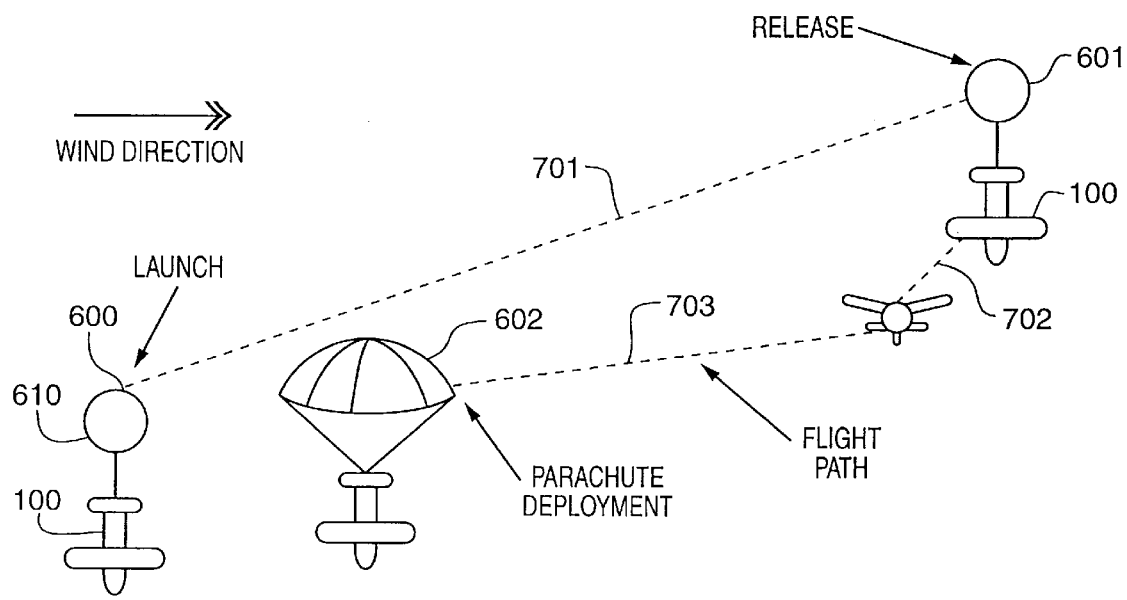

FIGS. 6 and 7 illustrate top plan and side plan views, respectively, of a typical flight plan of the recoverable airborne instrument platform 100. At location 600, the recoverable airborne instrument platform 100 is attached to a balloon 610 and launched in conventional manner. The wind direction is illustrated by the arrow and therefore, the recoverable airborne instrument platform 100 and its balloon 610 follows path 701 as the balloon 610 gains altitude and travels in a horizontal direction as determined by the wind direction, wind strength and rate of ascent of the balloon 610 with the attached recoverable airborne instrument platform 100. Upon attaining a predetermined altitude, or the balloon 610 bursting, at location 601 the flight control circuits operate cut-down device 211 to detach the balloon tether line from the recoverable airborne instrument platform 100 to thereby enable the recoverable airborne instrument platform 100 to glide without the balloon tether being attached thereto. Once freed from the balloon 610, the recoverable airborne instrument platform 100 must attain a level flight with the proper orientation. As the recoverable airborne instrument platform 100 performs this reorientation, it traverses the short path 702. Once the proper attitude is attained, the recoverable airborne instrument platform 100 follows flight path 703 to the recovery site at location 602 where the recovery parachute 210 is deployed as described below.

Hardware Architecture of Recoverable Airborne Instrument Platform

Figure 3:
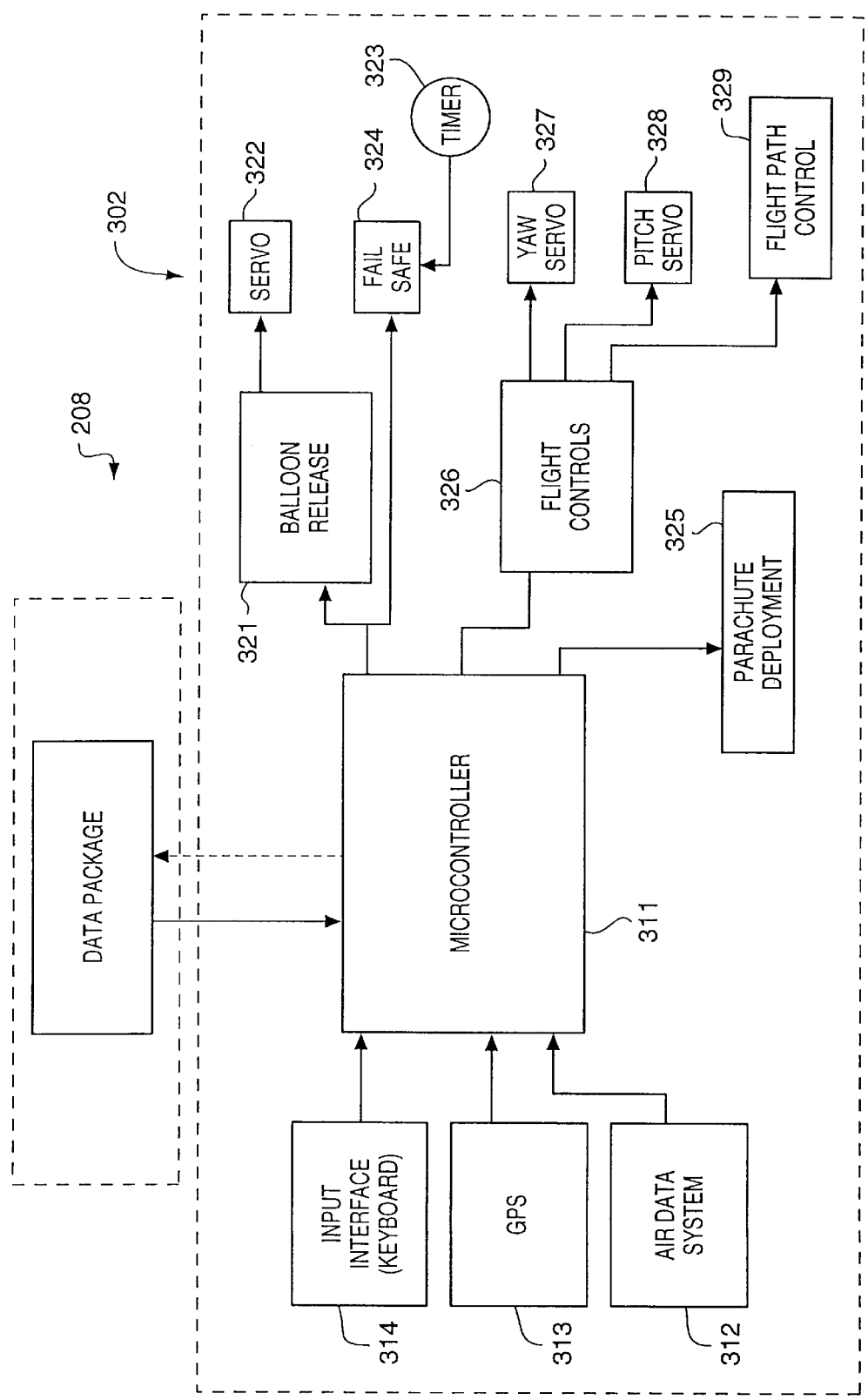
FIG. 3 illustrates in block diagram form the architecture of the apparatus contained in the recoverable airborne instrument platform airframe.

FIG. 3 illustrates in block diagram form the architecture of the apparatus contained in the recoverable airborne instrument platform airframe 111. The apparatus can be divided into payload 208 and control apparatus 302. The payload 208 comprises the sensors and measurement devices that the recoverable airborne instrument platform carries through the flight path to perform a predetermined series of measurements. The sensors are typically devices that can measure relevant meteorological characteristics: pressure, temperature, humidity, wind speed and direction, ozone, and the like. The payload 208 can include its own power source and/or memory, and/or telemetry link, as desired by the test operator and the load carrying capabilities of the recoverable airborne instrument platform 100. The control apparatus 302 comprises the flight control circuit and other various instrumentalities that are used to operate the recoverable airborne instrument platform during its mission. The central element of the control apparatus 302 comprises a microcontroller 311 and its programmed control scripts that interconnect to and regulates the operation of the remaining elements in the control apparatus 302. The microcontroller 311 receives data inputs from the air data system 312, the GPS receiver 313 and keypad interface 314 or a laptop computer. The keypad interface 314 enables a user to connect a keypad or laptop computer or other such data entry device to the control apparatus 302 for the purpose of data interchange. This data interchange typically occurs during preflight check and postflight data download. In the preflight check, the test operator inputs data into the microcontroller 311 that defines the various operating parameters of the recoverable airborne instrument platform 100. Typical parameters include but are not limited to: balloon release altitude, recovery site, landing altitude, σ value for distance from the recovery site, course deviation metric θ, recoverable airborne instrument platform payload weight, recoverable airborne instrument platform wing configuration, and the like.

The recoverable airborne instrument platform 100 includes a plurality of flight control circuits, including a heading sensor, and a guidance control circuit, both of which are implemented in the form of hardware, microcontroller 311 and software operable on microcontroller 311. The hardware includes a GPS receiver 313, which is a well known device that utilizes the signals broadcast by a plurality of earth orbiting GPS satellites to determine a precise location in three dimensional space. The air data system 312 comprises sensors that determine ambient wind speed as well as relative air speed of the recoverable airborne instrument platform 100. If the wind speed is greater than the glide speed of the recoverable airborne instrument platform 100, then the guidance control circuit operable on microcontroller 311 computes erroneous results since it determines that the recoverable airborne instrument platform 100 is on the wrong heading. Therefore, the heading sensor software, operable on microcontroller 311, uses the output of air data system 312 to determine air speed relative to the ambient wind conditions. This enables the recoverable airborne instrument platform 100 to determine the vehicle heading. In addition, there is a bidirectional data path between microcontroller 311 and the payload 208 to enable the microcontroller 311 to transmit control signals to the payload 208 to regulate its operation as a function of the mission being flown by the recoverable airborne instrument platform 100 as well as to receive data from the payload 208 for processing and/or storage or for use in the determination of the operation of the recoverable airborne instrument platform 100.

The microcontroller 311 outputs data to a variety of devices to control the flight of the recoverable airborne instrument platform 100. The balloon release 321 comprises a servo driver that functions in response to control signals received from the microcontroller 311 to activate servo mechanism 322 that operates the cut-down device 211 that releases the recoverable airborne instrument platform 100 from the balloon 610. In addition, there is provided a redundant balloon release mechanism that comprises a timer 323 and a fail safe release 324 that also operates the cut-down device 211 that releases the recoverable airborne instrument platform 100 from the balloon 610. The timer 323 is activated by the microcontroller 311 and upon reaching the conclusion of its timing period, activates the fail safe release 324. An example of such a fail safe release 324 is a fusible linkage that burns through upon the application of a current by the timer 323 to the fail safe release 324. This fail safe release 324 ensures that the recoverable airborne instrument platform 100 releases from the balloon 610 once the proper altitude is reached to prevent the balloon 610 from departing to parts unknown with the recoverable airborne instrument platform 100. There is also provided a parachute deployment control mechanism 325 as is described in additional detail below.

Another important mechanism included in the control apparatus 302 is the flight control mechanisms that guide the flight of the recoverable airborne instrument platform 100. These flight control mechanisms comprises flight controls 326, yaw servo 327, pitch servo 328 and flight path control 329. The flight path control 329 typically comprises servo mechanisms that control the operation of the rudder 116 that is mounted on the tail of the recoverable airborne instrument platform 100. The yaw servo 327 and pitch servo 328 control the operation of the elevators 117, 118 that are also mounted on the tail 115 of the recoverable airborne instrument platform 100. By placing all of the control surfaces on the tail 115 of the recoverable airborne instrument platform 100, the replacement of the wing 112 can be effected simply and without impacting the viability of the flight control mechanisms. The flight controls 326 comprise the servo drivers that are used to control the operation of the associated control surface servos.

Method of Operation of the Recoverable Airborne Instrument Platform

Figure 4:
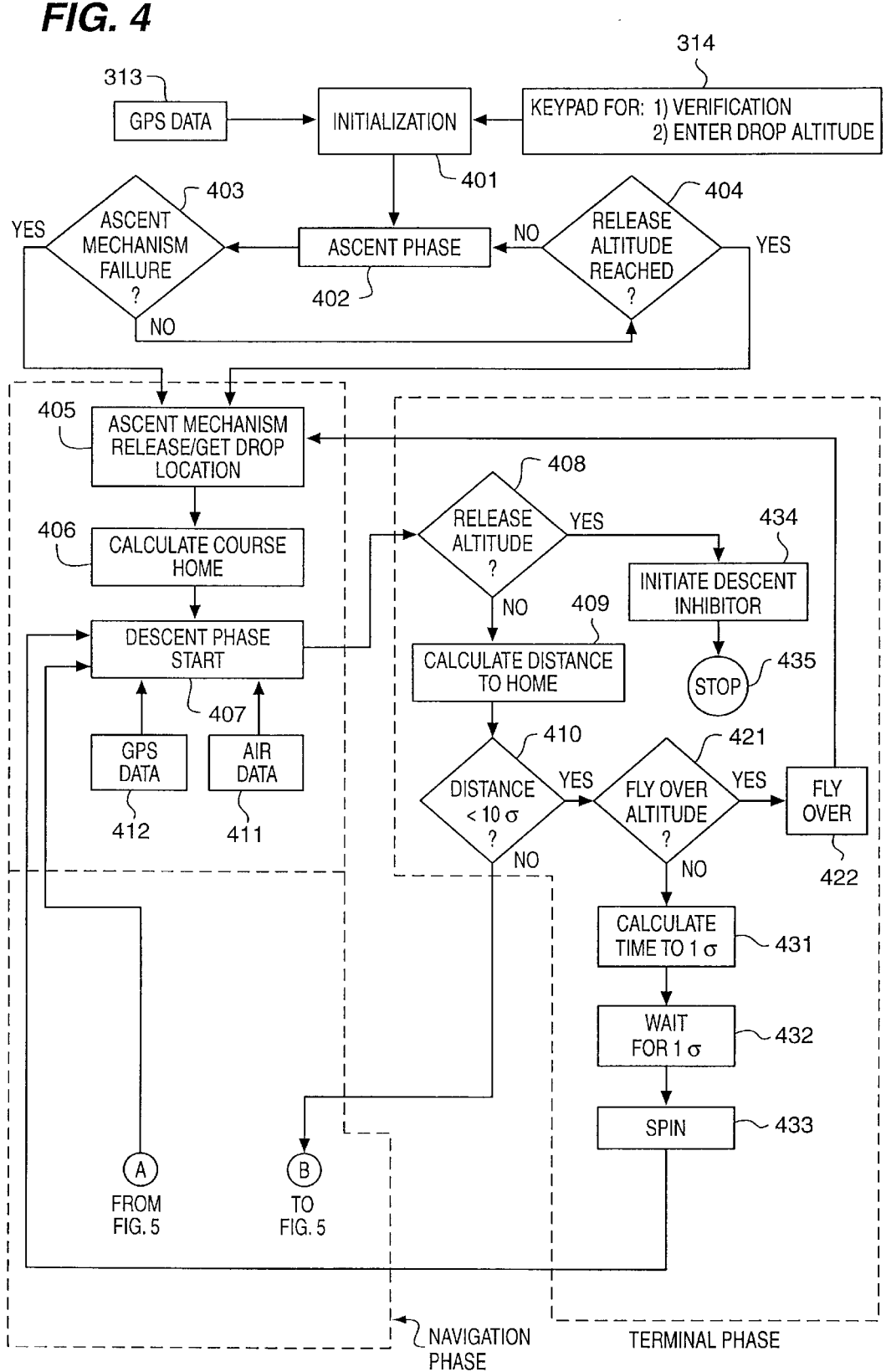
FIGS. 4 and 5 illustrate in flow diagram form the operation of the recoverable airborne instrument platform.
Figure 5:
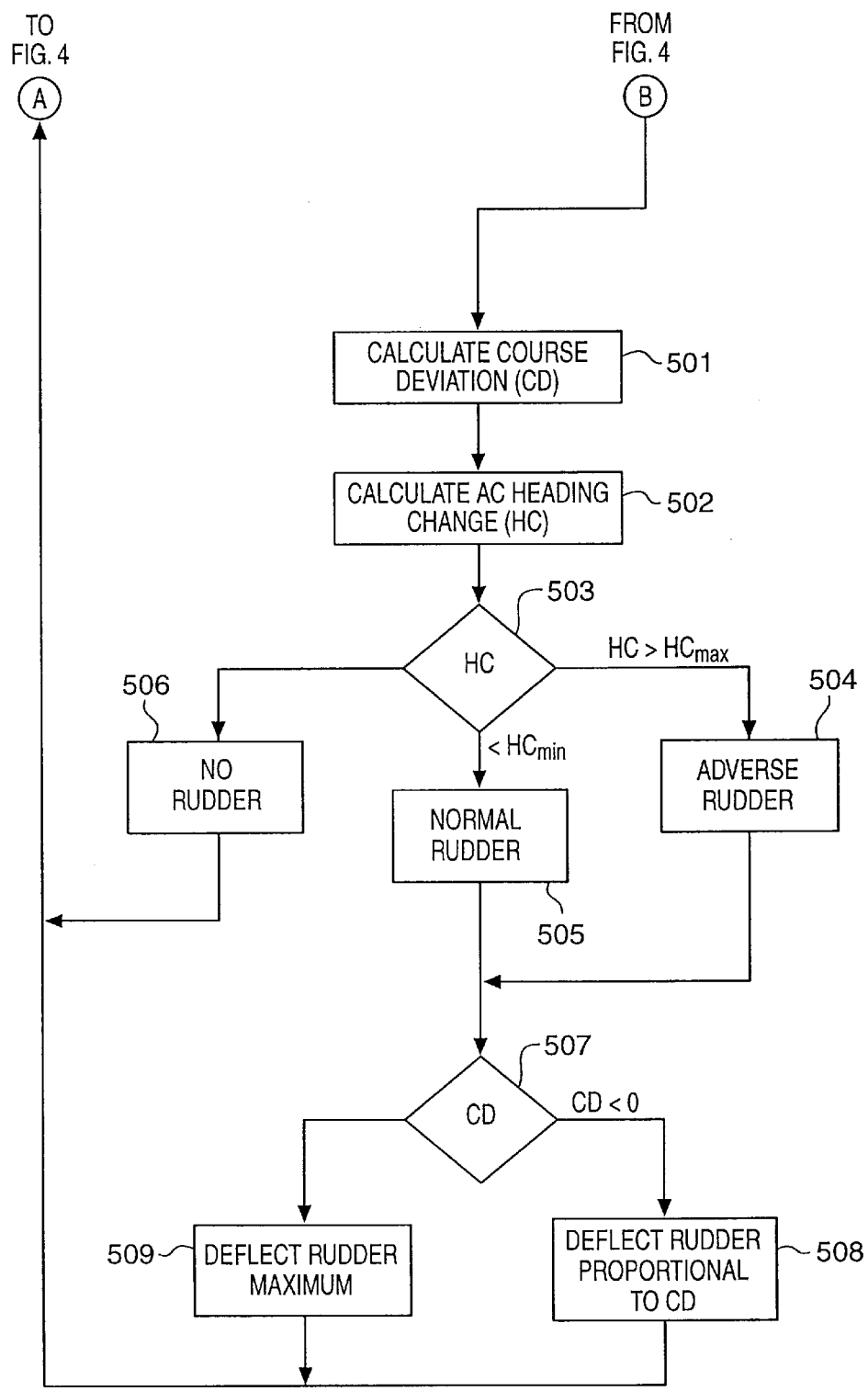

FIGS. 4 and 5 illustrate in flow diagram form the operation of the recoverable airborne instrument platform 100. At step 401, the recoverable airborne instrument platform 100 enters the initialization state. At this point, the recoverable airborne instrument platform 100 is located on the ground and receives GPS data from the GPS satellites that are extant over the launch site via GPS receiver 313. In addition, the recoverable airborne instrument platform operator has attached thereto the data entry device, such as a keypad, laptop computer or other data source to verify the integrity of operation of the recoverable airborne instrument platform 100 and to enter data into the microcontroller 311 to designate the drop altitude, point of retrieval and any other operational data that is required to initialize the operation of the recoverable airborne instrument platform 100. At step 402 the recoverable airborne instrument platform 100 begins its ascent phase where the attached lifting device such as a balloon 610 carries the recoverable airborne instrument platform 100 aloft. The recoverable airborne instrument platform 100 takes readings as the balloon 610 ascends to the recoverable airborne instrument platform 100 release altitude. During this ascent, the recoverable airborne instrument platform microcontroller 311 also monitors the ascent operation to ensure that the balloon 610 has not failed or the recoverable airborne instrument platform 100 has been inadvertently released. If the microcontroller 311 determines that there is not an ascent failure, the processing advances to step 403 where the GPS input is read to determine whether the release altitude has been reached. If not, processing returns to step 402 and the cycle of steps 402–404 continues until either the ascent mechanism failure (balloon burst) is detected or the release altitude is reached. At that juncture, processing advances to step 405 where the microcontroller 311 activates the balloon release mechanism and the drop location is determined from the present readings of the GPS data. The processing then advances to step 406 where the guidance control software operating on microcontroller 311 computes a course to the recovery site. Once the course is determined, processing advances to the process that initiates the descent phase at step 407. The descent process is initiated by retrieving air data at step 411 from the air data sensor 312 to ascertain the present heading of the recoverable airborne instrument platform and GPS data is retrieved at step 412 from the GPS receiver 313 to determine present three dimension position of the recoverable airborne instrument platform 100 in space. Once the position, airspeed and heading data is obtained, the terminal phase of operation is entered where the first determination that is made at step 408 is whether the landing altitude has been reached. If not, processing advances to step 409 where the microcontroller 311 computes the distance remaining to reach the recovery site. At step 410 the microcontroller 311 determines whether this distance is less than 10σ from the recovery site. If not, processing advances to step 501 where the present deviation from the calculated course is determined. At step 502 the heading change necessary to return to the proper heading to the recovery site is calculated and at step 503 this deviation is compared to a threshold to determine the extent of directional error. If the error exceeds the predetermined threshold, then at step 504 the direction to set the navigational rudder 116 to bring the recoverable airborne instrument platform 100 back on course is determined to be adverse rudder. If the deviation is less than a second predetermined threshold, then at step 505 the direction to set the navigational rudder 116 to bring the recoverable airborne instrument platform 100 back on course is determined to be normal rudder. If the deviation is between the first and second thresholds, no rudder correction is processed at step 506. At step 507, the course deviation is reviewed to determine whether the rudder 1 16 should be deflected to the maximum at step 509 or on a basis that is proportional to the course deviation at step 508.

Steps 501–508 are executed until at step 410 it is determined that the recoverable airborne instrument platform 100 is less than 10σ distance from the recovery site. At this time the flyover subroutine comprising steps 421, 422, 405–410 is activated. If the present altitude of the recoverable airborne instrument platform 100 is determined at step 421 to be in excess of a predetermined landing altitude, then the recoverable airborne instrument platform 100 is circled over the recovery site. This is accomplished by proceeding to step 422 where the recoverable airborne instrument platform 100 is guided to fly over the recovery site. Processing advances to step 405 where the drop location is retrieved from memory and at step 406 the course to the recovery site is calculated. The steps 407–410 are executed as noted above and step 421 is executed to determine when the recoverable airborne instrument platform 100 reaches the predetermined landing altitude. Once the recoverable airborne instrument platform 100 falls below this predetermined altitude, then the recoverable airborne instrument platform 100 can safely be brought to ground. This is accomplished by executing steps 431–433, 407, 408, 434, 435. At step 431 the time necessary to reach 1σ distance from the recovery site is determined. The microcontroller 311 waits this determined time at step 432 and when the recoverable airborne instrument platform 100 reaches a 1σ distance from the recovery site at step 433 the microcontroller 311 activates the flight control surfaces to put the recoverable airborne instrument platform 100 in a spin. Processing then advances to steps 407–408 and the recoverable airborne instrument platform 100 spins in a downward direction until the parachute release altitude is reached, then the parachute 210 is released when the appropriate altitude is reached. Processing then terminates at step 435 as the recoverable airborne instrument platform 100 has its descent to the recovery site slowed by the parachute 210. When the recoverable airborne instrument platform 100 impacts the ground, the nose cone trigger 213, 213 is activated to release the parachute 210 from the recoverable airborne instrument platform 100 to prevent ground drag damage after initial ground contact.

Summary

The recoverable airborne instrument platform is autonomous of ground control and can be programmed to fly any desired glide flight path. The recoverable airborne instrument platform uses air data and a heading system to determine the orientation of the recoverable airborne instrument platform and can operate its elevators for trim and speed control as well as flight path controls (spoilers, drag brakes, etc) to eliminate overflights and a rudder for heading control. The wings of the recoverable airborne instrument platform are removable and any of a number of wings can be installed to accommodate present wind conditions, range of operations and instrument payloads. The airframe is a wing/body vehicle not just aerodynamically shaped wing or delta wing which provides a significant improvement in range and flight control. The recoverable airborne instrument platform also uses a unique parachute reefing mechanism to minimize ground drag damage after initial ground contact. The microcontroller contained in the recoverable airborne instrument platform not only functions to operate the flight control mechanism, but also is part of an integrated system of onboard data storage and processing of the data that is collected by the various sensors that comprise the instrument package payload.

What is claimed:

1. A recoverable airborne instrument platform that contains an instrument package and returns to a ground level landing site in a self-guided manner comprising:

an aerodynamically shaped exterior housing that encloses said instrument package, including a plurality of moveable control surfaces to steer and control the airspeed of said recoverable airborne instrument platform;

a wing removably attached to said aerodynamically shaped exterior housing for controlling at least one of the flight characteristics of said recoverable airborne instrument platform from the class of flight characteristics including: lift to drag ratio, range of operations and instrument payloads;

means for determining a geographic position of said recoverable airborne instrument platform;

means for storing data indicative of the geographic position of at least one landing site;

means, responsive to said stored data and said determined geographic position, for computing a flight path for said recoverable airborne instrument platform from said determined geographic position to said landing site; and means, responsive to said computed flight path, for operating said moveable control surfaces to guide said recoverable airborne instrument platform along said flight path.

2. The recoverable airborne instrument platform of claim 1 further comprising:
   means for measuring altitude of said recoverable airborne instrument platform; and
   wherein said computing means is additionally responsive to said measured altitude to compute said flight path.

3. The recoverable airborne instrument platform of claim 1 further comprising:
   a parachute, deployable to slow the descent of said recoverable airborne instrument platform to said landing site.

4. The recoverable airborne instrument platform of claim 3 further comprising:
   means for measuring altitude of said recoverable airborne instrument platform; and
   means for deploying said parachute when said measured altitude is less than a predetermined value.

5. The recoverable airborne instrument platform of claim 1 wherein said exterior housing includes a moveable control surface comprising a rudder.

6. The recoverable airborne instrument platform of claim 1 wherein said determining means includes:
   means for monitoring a plurality of navigation signals generated external to said recoverable airborne instrument platform and broadcast to said recoverable airborne instrument platform; and
   means, responsive to said monitored navigation signals, for computing data indicative of the geographic position of said recoverable airborne instrument platform.

7. The recoverable airborne instrument platform of claim 6 wherein said navigation signals comprise signals broadcast from a plurality of satellites, comprising a Global Positioning System.

8. The recoverable airborne instrument platform of claim 6 wherein said computing means dynamically computes said flight path on a continuing basis in response to said determined geographic position, based on said monitored beacon signals.

9. The recoverable airborne instrument platform of claim 1 wherein said computing means dynamically computes said flight path on a continuing basis in response to said determined geographic position.

10. The recoverable airborne instrument platform of claim 1 further comprising:
    means for determining ambient wind speed and relative air speed of the recoverable airborne instrument platform; and
    means for calculating, independent of said determined geographic position, a heading of said recoverable airborne instrument platform from said ambient wind speed and relative air speed of the recoverable airborne instrument platform.

11. The recoverable airborne instrument platform of claim 10 wherein said means for computing is responsive to said heading to compute a flight path for said recoverable airborne instrument platform from said determined geographic position to said landing site.

12. The recoverable airborne instrument platform of claim 1 further comprising:
    means for releasably connecting said recoverable airborne instrument platform to a balloon to enable said recoverable airborne instrument platform from said balloon upon one of attainment of a predetermined altitude and bursting of said balloon.

13. A method of operating a recoverable airborne instrument platform that contains an instrument package and returns to a ground level landing site in a self-guided manner comprising the steps of:
    enclosing said instrument package in an aerodynamically shaped exterior housing, including a plurality of moveable control surfaces to steer and control the airspeed of said recoverable airborne instrument platform;
    attaching a removable wing to said aerodynamically shaped exterior housing for controlling at least one of the flight characteristics of said recoverable airborne instrument platform from the class of flight characteristics including: lift to drag ratio, range of operations and instrument payloads;
    determining a geographic position of said recoverable airborne instrument platform;
    storing data indicative of the geographic position of at least one landing site;
    computing, in response to said stored data and said determined geographic position, a flight path for said recoverable airborne instrument platform from said determined geographic position to said landing site; and
    operating, in response to said computed flight path, said moveable control surfaces to guide said recoverable airborne instrument platform along said flight path.

14. The method of operating a recoverable airborne instrument platform of claim 13 further comprising the step of:
    measuring altitude of said recoverable airborne instrument platform; and
    wherein said step of computing is responsive to said measured altitude to compute said flight path.

15. The method of operating a recoverable airborne instrument platform of claim 13 further comprising the step of:
    deploying a parachute to slow the descent of said recoverable airborne instrument platform to said landing site.

16. The method of operating a recoverable airborne instrument platform of claim 15 further comprising the steps of:
    measuring altitude of said recoverable airborne instrument platform; and
    deploying said parachute when said measured altitude is less than a predetermined value.

17. The method of operating a recoverable airborne instrument platform of claim 13 wherein said step of determining includes:
    monitoring a plurality of navigation signals generated external to said recoverable airborne instrument platform and broadcast to said recoverable airborne instrument platform; and
    computing, in response to said monitored navigation signals, data indicative of the geographic position of said recoverable airborne instrument platform.

18. The method of operating a recoverable airborne instrument platform of claim 17 wherein said step of computing dynamically computes said flight path on a continuing basis in response to said determined geographic position, based on said monitored beacon signals.

19. The method of operating a recoverable airborne instrument platform of claim 13 wherein said step of computing dynamically computes said flight path on a continuing basis in response to said determined geographic position.

20. The method of operating a recoverable airborne instrument platform of claim 13 further comprising the steps of:

determining ambient wind speed and relative air speed of the recoverable airborne instrument platform; and calculating a heading of said recoverable airborne instrument platform from said ambient wind speed and relative air speed of the recoverable airborne instrument platform.

21. The method of operating a recoverable airborne instrument platform of claim 20 wherein said step of computing is responsive to said heading to compute a flight path for said recoverable airborne instrument platform from said determined geographic position to said landing site.

22. The method of operating a recoverable airborne instrument platform of claim 13 further comprising the step of:

releasably connecting said recoverable airborne instrument platform to a balloon to enable said recoverable airborne instrument platform from said balloon upon one of attainment of a predetermined altitude and bursting of said balloon.

\* \* \* \* \*